United States Patent
Wang et al.

(10) Patent No.: US 10,847,025 B2
(45) Date of Patent: Nov. 24, 2020

(54) SYSTEM FOR CHANGING CONTROL INTERFACE OF CONTROLLED DEVICE BASED FUNCTIONS OF DEVICE

(71) Applicants: Chi-Hsiang Wang, Taichung (TW); Wan-Yu Hsien, Taichung (TW)

(72) Inventors: Chi-Hsiang Wang, Taichung (TW); Wan-Yu Hsien, Taichung (TW)

(*) Notice: Subject to any disclaimer, the term of this patent is extended or adjusted under 35 U.S.C. 154(b) by 0 days.

(21) Appl. No.: 16/573,617

(22) Filed: Sep. 17, 2019

(65) Prior Publication Data
US 2020/0090497 A1 Mar. 19, 2020

(30) Foreign Application Priority Data
Sep. 17, 2018 (TW) .............................. 107132689 A

(51) Int. Cl.
*G08C 17/02* (2006.01)
*H05B 47/175* (2020.01)

(52) U.S. Cl.
CPC .......... *G08C 17/02* (2013.01); *H05B 47/175* (2020.01); *G08C 2201/30* (2013.01); *G08C 2201/92* (2013.01)

(58) Field of Classification Search
CPC ................. G08C 17/02; G08C 2201/30; G08C 2201/92; H05B 47/175; E06B 9/11
See application file for complete search history.

(56) References Cited

U.S. PATENT DOCUMENTS

| | | | |
|---|---|---|---|
| 2004/0105264 A1 | 6/2004 | Spero | |
| 2007/0291483 A1 | 12/2007 | Lys | |
| 2011/0074672 A1* | 3/2011 | Diederiks | H05B 47/105 345/156 |
| 2016/0192458 A1* | 6/2016 | Keith | H05B 45/14 315/291 |
| 2017/0280533 A1* | 9/2017 | Dimberg | G01D 5/02 |

FOREIGN PATENT DOCUMENTS

| | | |
|---|---|---|
| JP | H0864017 A | 3/1996 |
| JP | H08222376 A | 8/1996 |
| KR | 100238690 B1 | 1/2000 |
| TW | 327673 B | 3/1998 |
| TW | I524566 B | 3/2016 |

* cited by examiner

*Primary Examiner* — Nabil H Syed
(74) *Attorney, Agent, or Firm* — Muncy, Geissler, Olds & Lowe, P.C.

(57) ABSTRACT

The present invention provides a system for changing a control interface of a controlled device based on functions of the device, in which a visual message is used as a medium to display a current working state of a controlled device on an interface to be operated by a user for recognition by the user, where the visual message includes different messages recognizable by the intensity, color, blinking of light or a lighting area provided by a visual unit.

8 Claims, 2 Drawing Sheets

SYSTEM FOR CHANGING CONTROL INTERFACE OF CONTROLLED DEVICE BASED FUNCTIONS OF DEVICE

BACKGROUND OF THE INVENTION

1. Field of the Invention

The present invention relates to control interface technologies of the internet of things (IoT), in particular, to a system for changing a control interface of a controlled device based on functions of the device.

2. Description of the Related Art

A dedicated controller is used to control a device such as a lighting device or an electric blind regardless of wired or wireless transmission. To be specific, the controller of the lighting device cannot be used to operate the electric blind, and vice versa. It becomes a headache to rummage through a number of controllers of devices as various types of devices proliferate. A universal controller technology is used in the prior art to remedy this. However, a conventional universal controller has fixed and unchangeable control units, and as a result the universal controller does not help a user recognize functions of control led devices, leading to inconvenience in use.

SUMMARY OF THE INVENTION

Therefore, a main objective of the present invention is to provide a system for changing a control interface of a controlled device based on functions of the device, in which a control interface used by a user to operate a controlled device is provided at a control end to display working information of the controlled device to enable the user to learn of a working state of the device via the control interface.

In view of this, to achieve the foregoing objective, the present invention provides a system for changing a control interface of a controlled device based on functions of the device, in which a visual message is used as a medium to display a current working state of a controlled device on an interface to be operated by a user for recognition by the user, where the visual message includes different messages recognizable by the intensity, color, blinking of light or a lighting area provided by a visual unit.

Further, to adapt to devices with different working modes, the system for changing a control interface of a controlled device based on functions of the device further includes a recognition and control unit configured to change display modes of the visual unit based on different working modes of the controlled device and change operable modes of an operation unit that is provided by the interface for the user to operate the controlled device, so that the visual unit and the operation unit can provide message displaying and operation modes that meet the functions of the controlled device.

Furthermore, the functions of the controlled device are distinguished based on different working actions that the controlled device can perform. In other words, the controlled device has a first working mode or a second working mode. The first working mode includes a first mode and a second mode. The second working mode has the first mode, the second mode, and a third mode. When the recognition and control unit recognizes that the controlled device has the first working mode, the visual unit performs displaying in a first display mode and the operation unit provides a first operation mode for operation by the user. When the recognition and control unit recognizes that the controlled device has the second working mode, the visual unit performs displaying in a second display mode and the operation unit provides a second operation mode for operation by the user.

The first operation mode is different from the second operation mode. The first operation mode and the second operation mode may be different in operations or actions of the user. Alternatively, the first operation mode and the second operation mode may have the same physical operations or actions, but based on different functions of the controlled device, the recognition and control unit may produce different operation results when the user performs the same operation or action at the same operation unit.

The first display mode is also different from the second display mode. The first display mode and the second display mode are different in visual presentations. For example, light is turned on in one of the first display mode and the second display mode and is turned off in the other, or the first display mode and the second display mode have different brightness, different colors, different lighting areas, or the like, or the first display mode and the second display mode have texts, symbols, marks, graphics or the like that are sufficient to convey different messages.

DETAILED DESCRIPTION OF THE PREFERRED EMBODIMENTS

Figure 1:
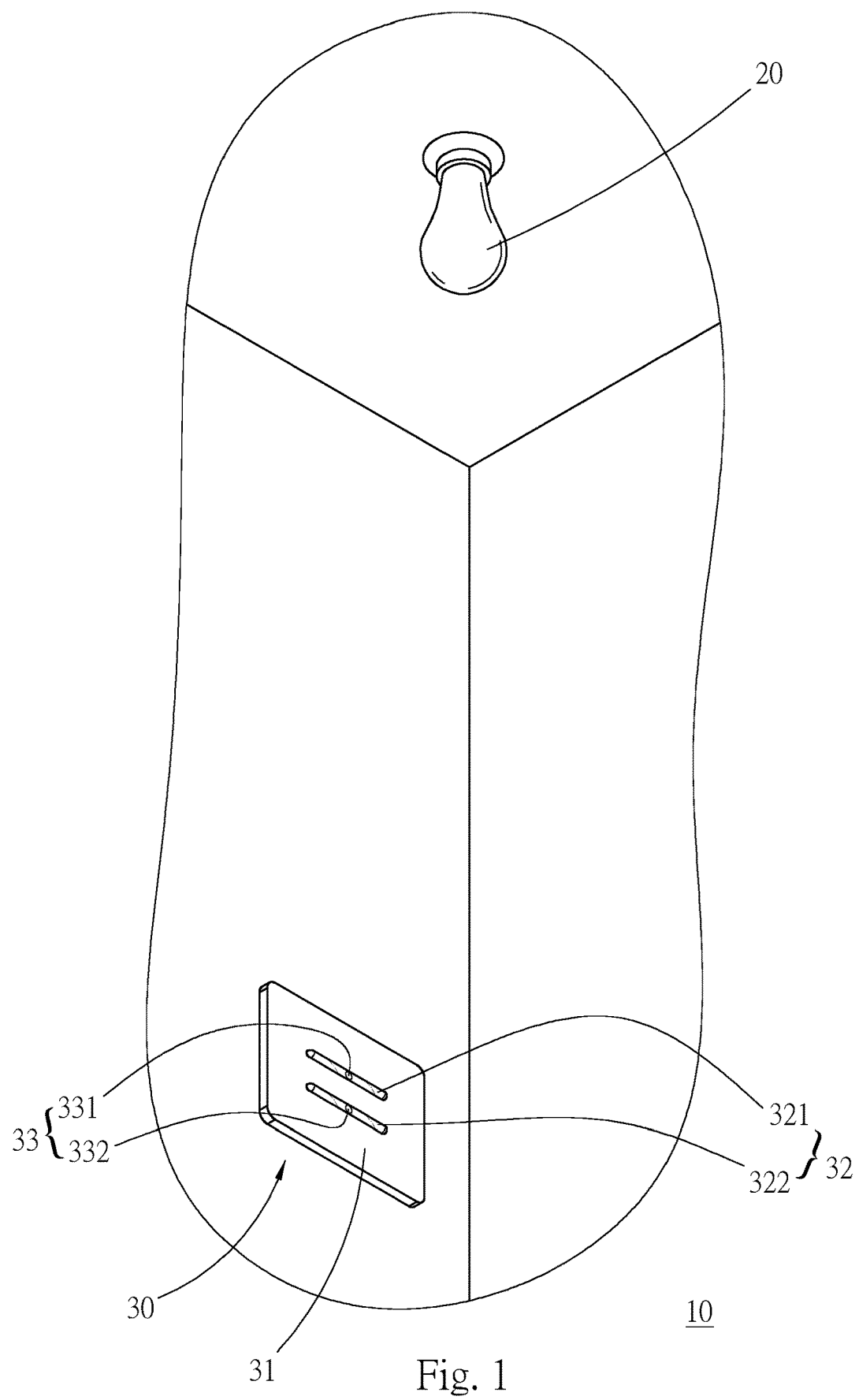
FIG. 1 is a schematic plan view of a preferred embodiment according to the present invention.

First, referring to FIG. 1, a system (10) for changing a control interface of a controlled device based on functions of the device provided in a preferred embodiment of the present invention mainly includes a controlled device (20), an interface (30), and a recognition and control unit.

The controlled device (20) is a lighting device with a dimming function. The lighting device exists and has been disclosed in the prior art, and is therefore not described in detail herein.

The interface (30) is a wall control switch member and has a panel (31) fixed on a wall surface of a building, an operation unit (32) protruding from the panel (31), and a visual unit (33) configured to display information by emitting visible light through the operation unit (32), so that a user may directly implement a regular switch pressing action on the operation unit (32) to control the controlled device (20), for example, to turn on, turn off or dim light, and at the same time, the user reads the message displayed by the visual unit (33) to learn of the functions of the controlled device (20) and whether a current working state of the controlled device (20) is to turn on, turn off or dim light, and can learn of a degree of dimming.

The operation unit (32) further includes a first operation portion (321) that is a physical button and protrudes from the panel (31) and allows light to pass through and a second operation portion (322) that is also a physical button, is vertically in parallel to the first operation portion (321) to protrude from the panel (31), and al lows light to pass through the button or a gap between the button and the panel as the first operation portion (321) does.

The visual unit (33) uses a light emitting element (not shown) disposed inside the interface (30) as a light source to obtain a first display portion (331), so that light produced by the light source is emitted through the first operation portion (321). A second display portion (332) enables light produced by another light source to be emitted through the second operation portion (322).

Figure 2:
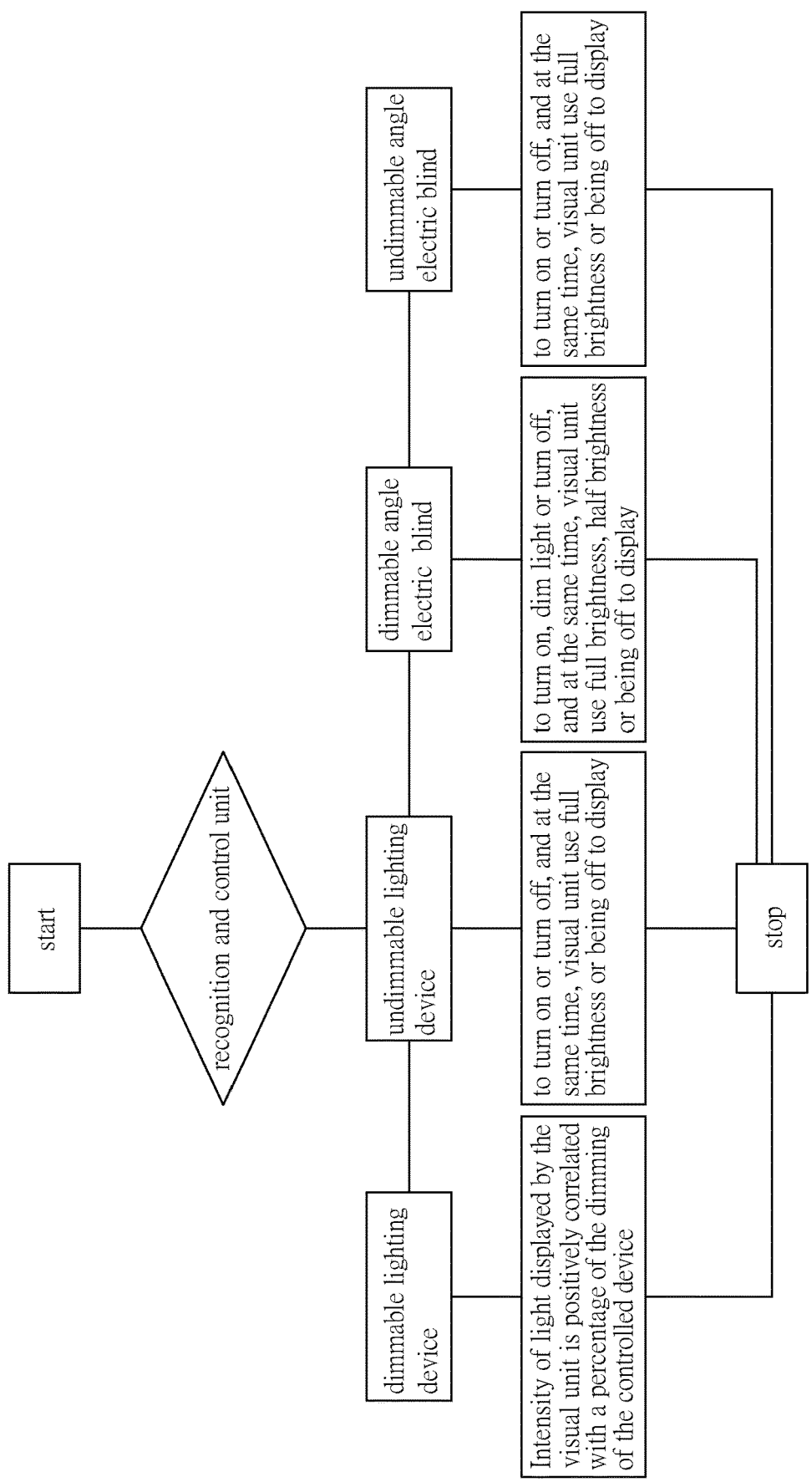
FIG. 2 is a flowchart of recognition according to a preferred embodiment of the present invention.

The recognition and control unit is configured to recognize a possible working mode of the controlled device, and based on a result of recognition, control a display mode of the visual unit (33) and control a mode provided by the operation unit (32) for operation by the user. Here, referring to FIG. 2 first, the recognition and control unit first receives information of the controlled device via a wired or wireless connection, determines whether the possible working mode of the controlled device is a first working mode or a second working mode, and then enables, based on different working modes, the interface (30) to provide operation modes of the operation unit (32) by using operation manners that meet the different working modes and display messages that meet the different working modes by using the visual unit (33).

It is preset that the first working mode includes a first mode and a second mode, and it is preset that the second working mode includes the first mode, the second mode, and a third mode.

The operation modes provided by the operation unit (32) include a first operation mode and a second operation mode, the first operation mode meets a function control requirement of the controlled device in the first working mode, and the second operation mode meets a function control requirement of the controlled device in the second working mode.

A possible display mode of the visual unit (33) includes a first display mode and a second display mode, the first display mode is suitable for displaying a working state in the first working mode, and the second display mode is suitable for displaying a working state in the second working mode.

Specifically, in this embodiment, when the recognition and control unit recognizes that the controlled device (20) is a dimmable lighting device with the second working mode, the visual unit (33) performs displaying in the second display mode, and at the same time the operation unit (32) provides the second operation mode for operation by the user. Corresponding to the functions of the controlled device (20), for example, it may be set that:

In the second working mode, the first mode is to turn on light, the second mode is to turn off light, and the third mode is to adjust the brightness of the lighting device.

For the second operation mode, the first operation portion (321) is used as a control interface for per forming the first mode and the third mode, and the second operation portion (322) is used as a control interface for per forming the second mode and the third mode:

A. Turn On Light

When the user short-presses the first operation portion (321), the recognition and control unit performs the first mode to make the controlled device (20) emit light.

B. Turn Off Light

When the user short-presses the second operation portion (322), the recognition and control unit performs the second mode to turn off the controlled device (20), and at the same time records a setting of a last working state before the controlled device (20) is turned off, so that the last working state be fore the controlled device (20) is turned off can be restored when the controlled device (20) is turned on a next time.

C. Dim Light

When the controlled device (20) keeps working in the first mode, that is, when the controlled device (20) is on, the operation unit (32) uses an action of continuously pressing, that is, long pressing the first operation portion (321) as a dimming operation interface for increasing brightness in the third mode, and uses an action of continuously pressing, that is, long pressing the second operation portion (322) as a dimming operation interface for reducing brightness in the third mode, so that the recognition and control unit may control the controlled device (20) to perform corresponding brightness adjustment based on an operation of the user during a the long press.

In the second display mode, the first display portion (331) and the second display portion (332) display the current working mode of the controlled device (20) by using the brightness of emitted light. For example, when the controlled device (20) is in the second mode, that is, is off, neither of the first display portion (331) and the second display portion (332) emits light. When the controlled device (20) is in the first mode, that is, is on, both the first display portion (331) and the second display portion (332) emit light. However, the intensity of displayed light corresponds to current light intensity of the controlled device (20). To be specific, lighting intensity of the first display portion (331) and lighting intensity of the second display portion (332) are determined by a current dimming state of performing the third mode of the controlled device (20), so that the intensity of light displayed by the visual unit (33) is positively correlated with a percentage of the dimming of the controlled device (20). In this way, the user may visually observe the visual unit (33) to learn of a working state of light of the controlled device (20).

The foregoing settings are merely examples for description, and may still be changed according to the habit of a user or other factors, but do not constitute any limitation. For example, changes in displaying manners of the visual unit, changes in the operation manners provided by the operation unit, and the like can all be implemented by a person of ordinary skill in the art of the present invention based on the present invention, and shall be protected by the present invention.

Referring to FIG. 2 again, when the recognition and control unit recognizes that the controlled device is an electric blind with the second working mode, for example, it may be set that the first mode in the second working mode is to open the blind, the second mode is to close the blind, and the third mode is to rotate blind slats to a different angle. The second operation mode enables the first operation portion to control the first mode and the third mode to be performed or stopped. To be specific, the first operation portion is short-pressed to start to perform or stop performing the first mode, and is long-pressed to perform an action of adjusting the blind slats to rotate in, for example, a clockwise direction, in the third mode during the press.

In the second operation mode, the second operation portion is used to control start and stop of the second mode and the third mode. To be specific, the second operation portion is short-pressed to start or stop the second mode, and is long-pressed to perform an action of adjusting the blind slats to rotate in, for example, a counterclockwise direction, in the third mode during the press.

In the second display mode, the visual unit uses full brightness to display that the first mode or the second mode starts to be performed, the visual unit uses half brightness to display that the third mode is being performed, and the visual unit is off to display that the first mode or the second mode stops being performed.

The recognition and control unit recognizes that the controlled device is a conventional light fixture with the first working mode or an electric blind without a slat rotation function. For the light fixture, the first mode in the first working mode is to turn on light, and the second mode is to turn off light. In the first operation mode, the first operation portion may be used as an execution control interface of the first mode, and the second operation portion is used as the execution control interface of the second mode. To be specific, the user presses the first operation portion to turn on light, and presses the second operation portion to turnoff light. In the first display mode, the visual unit is at full brightness when light is turned on, and the visual unit is off when light is turned off. For the electric blind, the operation unit of the interface (30) only provides an operation interface for opening or closing the blind, and at the same time, the visual unit only provides functions of being at full brightness or being off. In the foregoing case, in the first operation mode, both the first operation portion and the second operation portion only accept a short press. The interface performs no action when the user performs a long press. Therefore, the interface provides an operation mode different from that in control of the foregoing device with dimming or adjustable slats. In this way, the user may learn of functions of the control device based on functions allowed by the interface, so that great convenience is provided in use.

In addition, it should be further noted that in the technology of the interface, the interface may be a touch panel in addition to the structure in which buttons are used as these operation portions in the embodiments disclosed above. In this case, both the visual unit and the operation unit are included in the touch panel.

In conclusion, by means of the system for changing a control interface of a controlled device based on functions of the device provided in the present invention, operation manners and information displaying of an interface with a fixed structure may be changed based on different functions of controlled devices, so as to adapt to the use of different devices. It is not necessary to separately configure dedicated control interfaces for devices with different functions. By comparison, the system for changing a control interface of a controlled device based on functions of the device provided in the present invention has better use efficiency.

(10) System for changing a control interface of a controlled device based on functions of the device
(20) Controlled device (30) Interface (31) Panel
(32) Operation unit (321) First operation portion
(322) Second operation portion
(33) Visual unit (331) First display portion
(332) Second display portion

What is claimed is:

1. A system for changing a control interface of a controlled device based on functions of the controlled device, comprising:
a controlled device, having a first working mode or a second working mode;
an interface, having a visual unit performing displaying in a first display mode or a second display mode and an operation unit operated by a user to receive an operation message of the user;
a recognition and control unit, configured to recognize a possible working mode of the controlled device, wherein when the controlled device is a device with the first working mode, the visual unit performs displaying in the first display mode, and the operation unit provides a first operation mode for operation by the user, and when the controlled device is a device with the second working mode, the visual unit performs displaying in the second display mode, and the operation unit provides a second operation mode for operation by the user, wherein
the first working mode comprises a first mode and a second mode;
the second working mode comprises the first mode, the second mode, and a third mode;
the visual unit has a first display portion and a second display portion, and when the visual unit performs displaying in the first display mode, the first display portion displays a message of the first mode, and the second display portion displays a message of the second mode;
when the visual unit performs displaying in the second display mode, the first display portion displays a message of the first mode, the second display portion displays a message of the second mode, and the first display portion or the second display portion displays a message of the third mode;
the first display portion uses full brightness to display that the first mode is being performed and is turned off to display that the first mode is stopped, the second display portion uses full brightness to display that the second mode is being performed and is turned off to display that the second mode is stopped, and the first display portion and the second display portion separately use half brightness to display that the third mode is being performed.

2. The system for changing a control interface of a controlled device based on functions of the controlled device according to claim 1, wherein the first display portion and the second display portion separately perform displaying by using light.

3. The system for changing a control interface of a controlled device based on functions of the controlled device according to claim 2, wherein the controlled device is a dimmable lighting device with the second working mode, the third mode is light adjustment of the lighting device, and light intensity of displaying of the first display portion or the second display portion is positively correlated with a light adjustment percentage of the lighting device.

4. The system for changing a control interface of a controlled device based on functions of the controlled device according to claim 2, wherein the controlled device is a blind drawing driving device with the second working mode, the first mode is to start to open or stop opening a blind, the second mode is to start to close or stop closing the blind, and the third mode is to adjust a blocking angle of the blind.

5. The system for changing a control interface of a controlled device based on functions of the controlled device according to claim 2, wherein the controlled device is an undimmable lighting device with the first working mode; and the first display portion uses the most intense light to display the first mode, and the second display portion is turned off to display the second mode.

6. The system for changing a control interface of a controlled device based on functions of the controlled device according to claim 2, wherein light produced by the first display portion and light produced by the second display portion are respectively emitted through the first operation portion and the second operation portion.

7. The system for changing a control interface of a controlled device based on functions of the controlled device according to claim 6, wherein the control interface is a touch panel.

8. The system for changing a control interface of a controlled device based on functions of the controlled device according to claim 6, wherein the first operation portion and the second operation portion are buttons respectively.

\* \* \* \* \*